Jan. 4, 1944.  L. B. HAIGH  2,338,242
LINE IDENTIFICATION
Filed April 18, 1942   7 Sheets-Sheet 1

INVENTOR
Leslie B. Haigh
BY
ATTORNEY

Jan. 4, 1944.  L. B. HAIGH  2,338,242
LINE IDENTIFICATION
Filed April 18, 1942  7 Sheets-Sheet 3

Jan. 4, 1944.    L. B. HAIGH    2,338,242
LINE IDENTIFICATION
Filed April 18, 1942    7 Sheets-Sheet 5

INVENTOR
Leslie B. Haigh
BY
R. J. Perry
ATTORNEY

Jan. 4, 1944.    L. B. HAIGH    2,338,242
LINE IDENTIFICATION
Filed April 18, 1942    7 Sheets-Sheet 6

INVENTOR
Leslie B. Haigh
BY
ATTORNEY

INVENTOR
Leslie B. Haigh
BY
ATTORNEY

Patented Jan. 4, 1944

2,338,242

UNITED STATES PATENT OFFICE 2,338,242

LINE IDENTIFICATION

Leslie B. Haigh, West Orange, N. J., assignor to International Standard Electric Corporation, New York, N. Y., a corporation of Delaware Application April 18, 1942, Serial No. 439,495
In Great Britain August 15, 1941

23 Claims. (Cl. 179—27)

This invention relates to telecommunication exchanges and more particularly to a circuit arrangement for identifying a line connected to such an exchange. Circuit arrangements for automatically identifying a line connected to a telecommunication exchange are necessary in systems in which particulars of calls are automatically recorded on printed tickets, known as "automatic ticketing" systems, but such arrangements may also be required in other circumstances and for other purposes, as, for example, to display the designation of a calling line in front of an operator for the purpose of checking a malicious call or for checking the designation of a line from which a long distance call has been requested.

It is the object of the present invention to provide circuit arrangements for automatically identifying a line connected to a telecommunication exchange which will be economical in apparatus and rapid in action.

According to one feature of the present invention such a circuit arrangement comprises a plurality of points less in number than the number of lines connected to said exchange and divided into sets one for each denomination of the digits of a line designation, a network of connections of the lines to the points such that each line is connected to points characteristic of the values of the respective digits of its designation, means for connecting potential to a line to be identified, means operative by said potential in circuits including said points to which the last mentioned line is connected for causing the registration of the values of the digits of the designation of said line, and decoupling means for preventing said potential being extended over any of said points to cause the registration of the values of the designation of a line not required to be identified.

The invention provides for an exchange of 10,000 lines what is in effect the equivalent of a 10,000 contact switch, so that the values of the four digits of a line designation may, if desired, be registered in a single stage. The consequent saving of time in the process of identification of a line is so great that the number of switches required is considerably reduced.

In one embodiment of the invention the above mentioned switch comprises 400 contacts for each denomination of the digits of a line designation so that for a 10,000 line exchange, only 400 contacts are needed for connection to the lines of the exchange. The arrangement of the connections of the lines to the contacts is such that, combined with decoupling impedances in these connections, a potential applied to a line to be identified will not be extended over any connections common to more than one line so as to cause a registration of an incorrect number.

In all previously known arrangements for identifying a line, potential has been applied to mark the particular line required to be identified, and identification switches have then been caused to hunt for the marking potential. The present invention however renders it possible for this arrangement to be reversed, i. e., for the marking potential to be applied in a forward direction over the contacts of a switch which is closing in sequence contacts connected to different lines.

According to another feature of this invention therefore a circuit arrangement is provided for indicating which of a group of telecommunication lines is participating in a connection comprising potential applying means for applying a potential to each of the group of lines in predetermined sequence, potential responsive means responsive to the reception of said potential at a point in the connection and means for indicating the position of said potential applying means in said sequence at the moment when the potential responsive means responds.

The nature of the invention will be better understood from the following description of certain embodiments thereof taken in conjunction with the accompanying drawings, in which Figure 1 shows an embodiment of the invention in which metal rectifiers are used for substantially preventing the potential applied to the line, the identity of which is to be discovered, from being extended to any other of the lines in the exchange;

Figure 7 shows a modification of the arrangement shown in several of the other figures in which certain condensers are replaced by relays for storing the designaiton of a calling line; whilst

Figure 1:
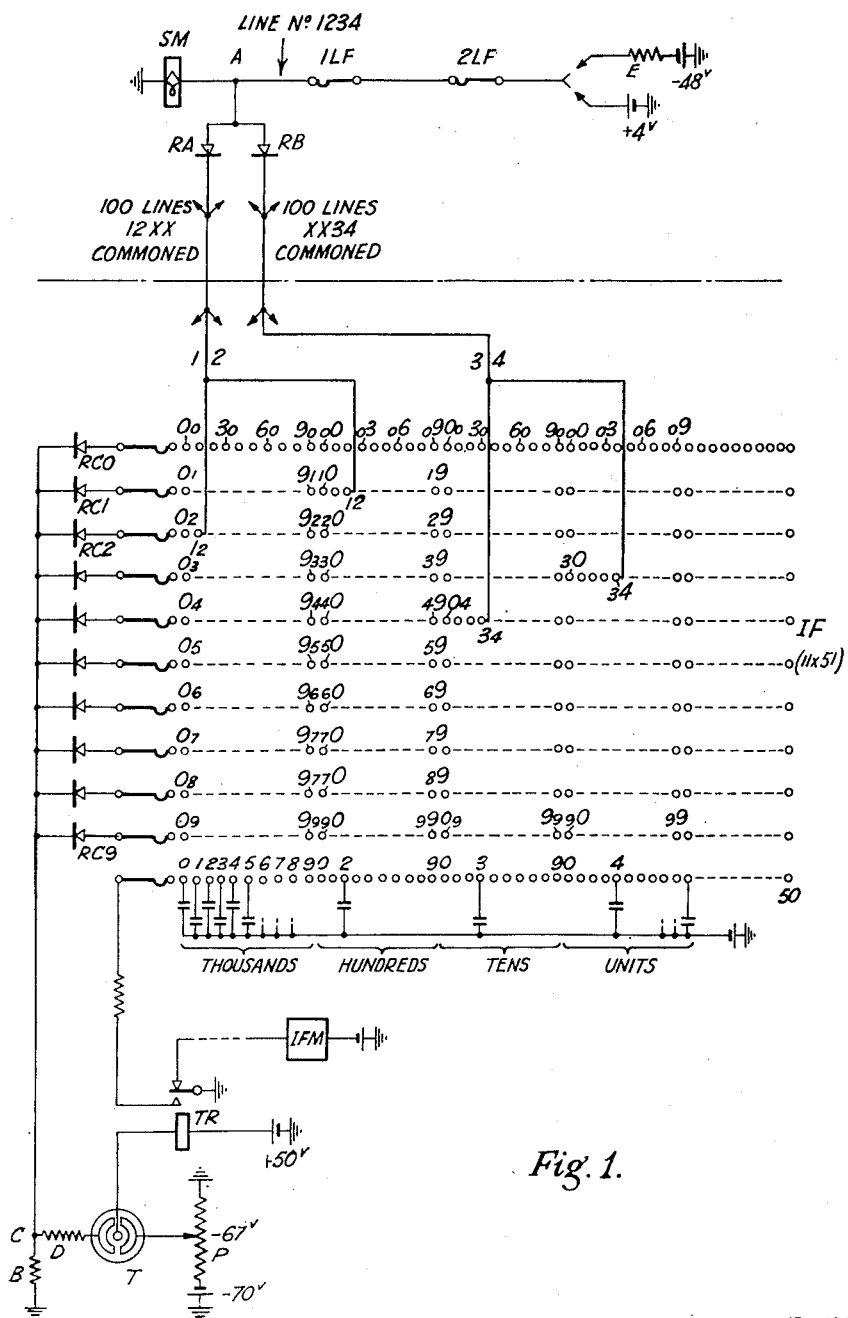

Referring to the drawings, Fig. 1 shows an arrangement for a telecommunication exchange containing up to 10,000 lines for identifying any one of said lines by means of a progressively operable switch with a capacity of 400 bank contacts to which the metering wires of the lines are connected. The drawings show the metering wire of line No. 1234 connected to ground over a meter magnet SM. This wire is shown diagrammatically as extended over contacts and wipers of first and second line finders ILF and 2LF to a point at which potential other than ground potential is to be applied. If a call has been made from line 1234 and the charge for the call is to be metered the negative pole of a 48 volt battery is connected over a resistance E to the meter wire and the meter magnet SM is operated, either once or, if well known arrangements for multi-metering are employed, a number of times.

If, on the other hand, the line is to be identified, a marking positive potential of 4 volts is connected to the meter wire so that the meter magnet SM is not operated.

Point A of the meter wire is connected to certain of the contacts of a switch IF. These contacts are divided into sets, each set individual to a denomination of digits in the designation of lines connected to the exchange. For a 10,000 line exchange each set of contacts comprises 10 contacts in each of ten banks. The first ten contacts in the ten banks constitute the set for the thousands digit, the second the set for the hundreds digit, the third for the tens digit, and the fourth for the units digit. In each set the first contacts in all the banks are allotted to the value 0 of the digit of that denomination, the second contacts to value 1 and so on. The point A of the meter wire of each line is connected through the rectifier RA to a point common to all lines having the thousands and hundreds part of the designation the same. Thus the line 1234 is connected through rectifier RA to a wire common to all lines having a designation commencing with 12. This wire is then connected to a contact in each of the first two sets of contacts, being connected to a contact of a set having a number in its bank equal to the value of the respective digit in the designation of said line and situated in a bank having a number equal to the value of the digit of the other denomination. Thus the wire 12 is connected to contact No. 1 in the bank No. 2 of the thousands set of contacts and to the contact No. 2 in the bank No. 1 in the hundreds set of contacts. The point A is also connected through rectifier RB which is poled similarly with respect to the line to rectifier RA to a wire common to all lines having the same last two digits and this wire is connected to contacts in the tens and units sets of contacts similarly to the connection of the wire for the thousands and hundreds digits of the contacts in those sets of contacts.

The brushes wiping over the banks of contacts are connected over separate rectifiers RC0-RC9 to a common wire and through resistance B to ground. Point C of this wire is connected through a high resistance D, for example, ½ megohm, to the control electrode of a cold cathode gas-filled discharge tube T. The cathode of this tube is connected to a point on a potentiometer P which is at a high negative potential suitably about −67 volts. The anode of the tube T is connected through a resistance TR to the positive pole of a 50 volt battery. The switch IF is provided with an 11th bank of contacts to each of which is connected one plate of a condenser, the other plates of the condensers being connected in common to a suitable battery. The brush of this 11th bank is connected to front contacts of the relay TR.

The rectifiers RA, RB and RC0-RC9 may be single element selenium rectifiers and are all poled to afford a path from the positive 4 volt potential connected to the line to ground over a contact of the switch IF.

The circuit of the magnet IFM driving the switch IF is completed over a back contact of the relay TR and the brushes of the switch are stepped over their bank contacts. When one of the brushes reaches a contact to which is connected a line to which positive potential is applied, for example, the line 1234, positive potential flows from the point A through the rectifier RA, the rectifier connected to one of the brushes, for example, RC2, resistance B, ground. A potential is set up at the point C which is sufficient to initiate a discharge in the tube T and since the anode of the tube is at positive potential a discharge also takes place between the anode and cathode of the tube and current flows through the relay TR. This relay operates and breaks the circuit of the magnet IFM to stop the switch. Thereupon the condenser connected to the contact of the 11th bank upon which the switch has stopped will be charged and this condenser will thereby register the value of the thousands digit in the designation of the line connected to contacts on which the switch has stopped.

Circuits of well known character are provided for reclosing the circuit of the magnet IFM and setting the switch again into movement whereupon the discharge in the tube T is extinguished. Thereafter, upon the brushes of the switch reaching in turn contacts in the hundreds, tens and units sets of contacts having numbers corresponding to the values of the hundreds, tens and units digits in the designation of the line to which positive potential is applied, switch IF will stop, a condenser corresponding to the value of the digit will be charged, the switch will be started into operation again, and finally the switch will come to rest upon its normal contacts.

It is to be understood that the switch IF may be any form of progressively operated switch and need not necessarily be one in which brushes move over bank contacts.

It is to be understood that only one switch such as IF in any exchange must be moving at any one time. It is also to be understood that in an exchange having a less capacity than 10,000 lines the number of contacts used in each bank of the switch IF will be correspondingly reduced. Thus for an exchange having a capacity of 1000 lines only each line would be connected through a rectifier RA to one contact in the hundreds sets of contacts and through the rectifier RB to contacts in the tens and units sets, and furthermore, only one bank of contacts in the hundreds set need be utilised.

It will be noted that in the arrangement shown in Fig. 1 the potential that marks a line the identity of which is to be discovered is connected to a wire of the line that is already used for metering, thus avoiding the provision of additional sets of contacts in the line finders ILF and 2LF for use in identification circuits. The cold cathode gas-filled tube T can be ignited by a low potential on the control electrode if the cathode is as shown connected to a high negative potential so that the voltage of the battery marking a line for the purpose of its identity being discovered can be low enough to avoid any danger of the meter being improperly operated. On the other hand when the brushes of the switch IF are on contacts connected to other lines than the marked line the effect of shunt paths to the potential applied to the marked line in creating a potential at the point C is insufficient to initiate a discharge in the tube T. The meter magnet SM is preferably shunted by a resistance in order to prevent the momentary negative potential at point A when the metering battery is disconnected rising sufficiently high to cause damage to the rectifiers RA and RB, i. e., to more than —12 volts.

Figure 2:
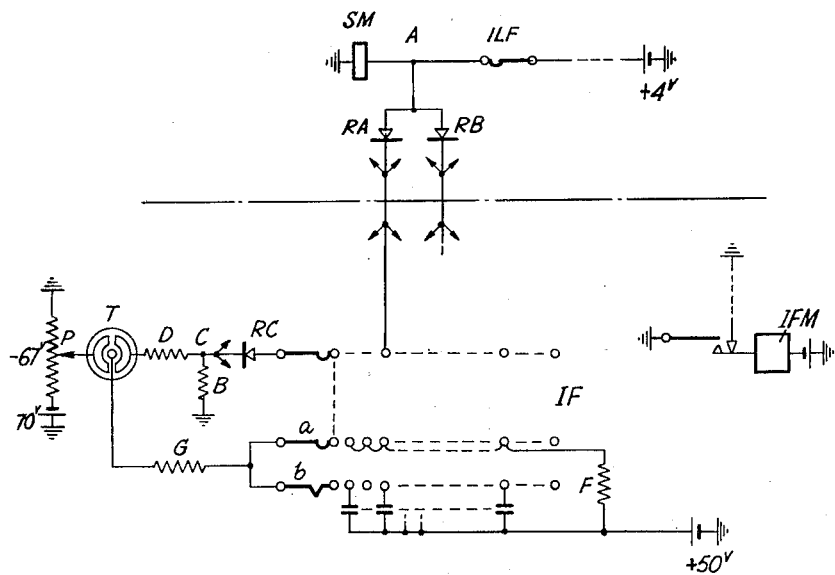
Figure 2 shows a modification of a portion of Fig. 1.

Fig. 2 shows a modification of Fig. 1 in which two banks of contacts are employed additional to the ten banks containing contacts connected to subscribers' lines. The brushes a and b moving over these contacts are connected together. The contacts moved over by the brush b are connected to individual condensers which are to be charged to register the values of the respective digits in the line designation as in Fig. 1, the common terminal of these condensers being connected to positive pole of a battery. This common terminal is also connected to all the contacts on bank A except the home contact through a resisance F, whilst the brushes a and b are connected through a resistance G to the anode of the cold cathode tube. In this embodiment the switch IF does not stop on the marked contacts, but as a marked contact is reached a discharge is initiated in the tube T and current flows over the corresponding condenser to charge it. The discharge in the tube T is extinguished when the brush a leaves the contact. The capacity of the condensers to be charged may be made small because it is possible to detect those condensers that have been charged by the use of another tube similar to tube T when the designation of the line is to be transmitted, as will be referred to hereinafter.

Any condenser that has been charged during the travel of the brushes a and b will be discharged during a subsequent travel of the brushes (provided the contact to which the condenser is connected is not marked a second time) because of the presence of the resistance F shunted across the condenser.

Figure 3:
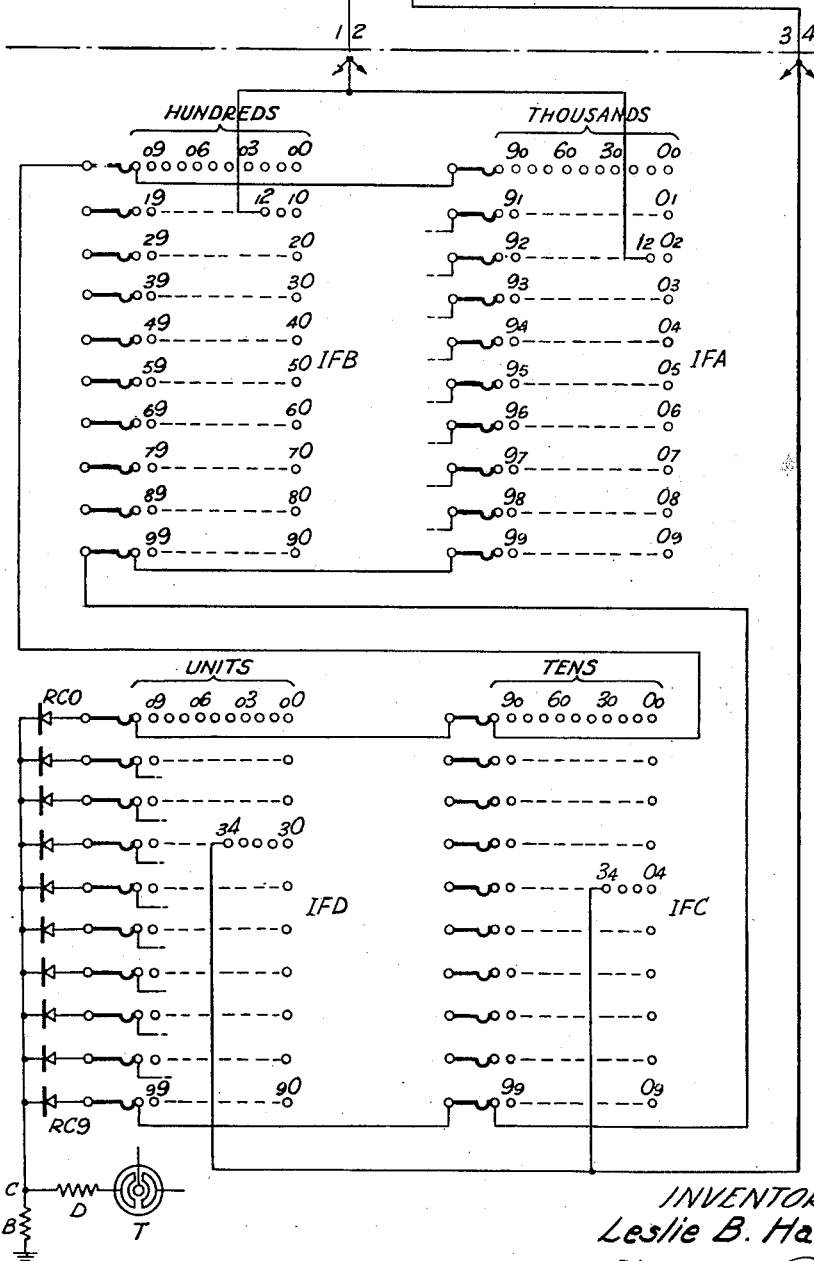
Figure 3 shows a further modification of Fig. 1.

Fig. 3 shows a further modification of Fig. 1 in which the switch IF is replaced by four similar switches IFA, IFB, IFC, IFD, containing respectively the sets of contacts individual to the thousands, hundreds, tens and units digits. The brushes of the switch IFA are connected to the home contacts of the switch IFB, the brushes of which are connected to the corresponding home contacts of the switch IFC, the brushes of which are in turn connected to the home contacts of the switch IFD, the brushes of the switch IFD are connected over individual rectifiers RC0—RC9 to ground over a resistance B, the point C, being connected over resistance D to the control electrode of a cold cathode tube as in the case of Fig. 1. The circuits controlled by the initiation of a discharge in the tube T and the circuits for starting and stopping the switches IFA, IFB, IFC and IFD are not shown since their arrangement will be apparent to anyone skilled in the art from the following description.

The switch IFA is first started to hunt for the contact indicative of the value of the thousands digit and when this contact is found by the initiation of a discharge in tube T the switch IFA is stopped and the switch IFB started. When a discharge is initiated upon switch IFB finding a marked contact the switch IFB is stopped and the switch IFC started, which is in turn stopped on a marked contact and the switch IFD started and then stopped on a marked contact. The positions in which the brushes of the respective switches stop indicate directly the values of the four required digits. Preferably the connections from the subscriber's line through the rectifiers RA and RB are made to the contacts of these switches in the reverse order as indicated in Fig. 3. The switches may then be stepped home in turn and in so doing send impulses representing the values of the digit registered since the number of steps each switch makes, less 1, is the value of the digit registered and it is therefore not necessary to use any other means of storing the values of these digits. The speed of the circuit can be still further increased by arranging the connections so that switches IFA or IFB may hunt simultaneously with IFC or IFD.

Figure 4:
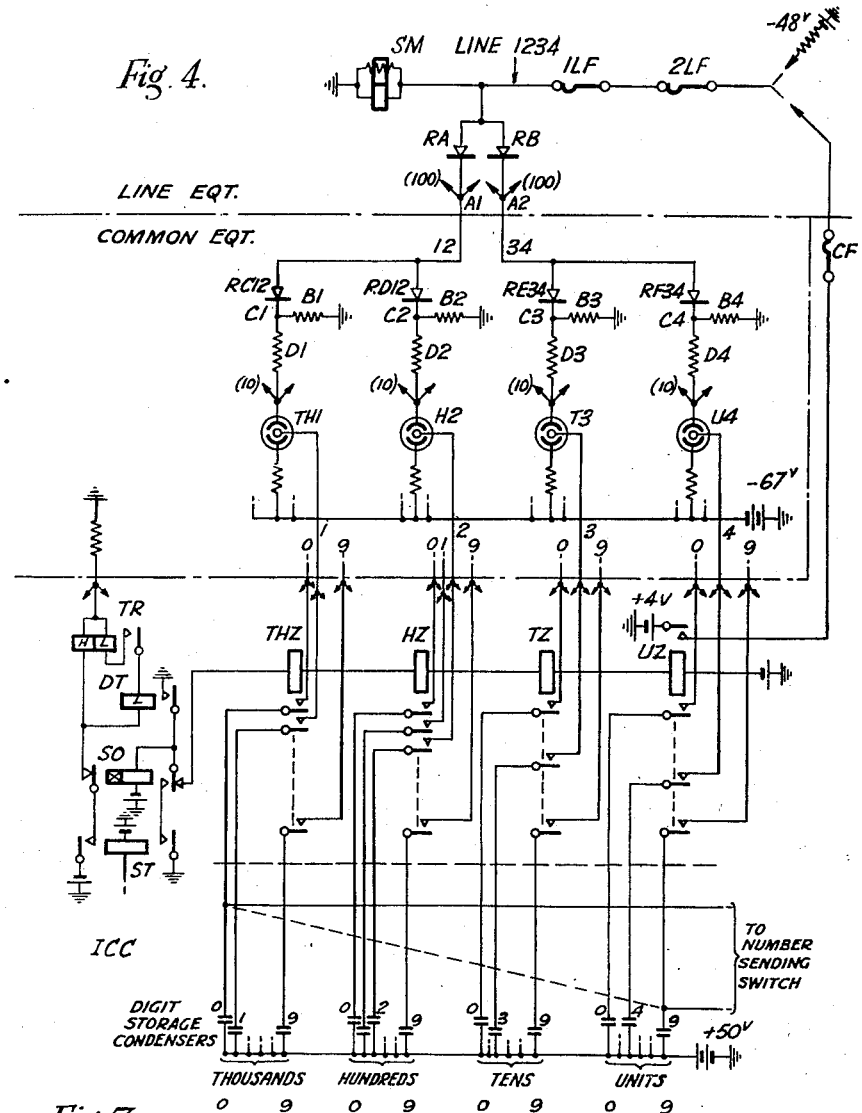
Figure 4 shows a modification of the arrangement shown in Fig. 1 for the purpose of obtaining a simultaneous registration of the values of the digits of all the denominations of a line designation.

A further modification is shown in Fig. 4 in which a hunting switch is dispensed with and the designation of a line is determined and stored completely by purely static means. The meter wire of a line is connected, as in Fig. 1, through rectifiers RA and RB individual to the line to points common respectively to all lines having the same first two digits and to all lines having the same last two digits. These 200 common points, however, instead of being connected directly to contacts of a switch are each taken to two more rectifiers RC and RD for the thousands and hundreds wires respectively and RE and RF for the tens and units wires respectively. These rectifiers are in turn connected over resistances B to ground, and over resistances D similarly dimensioned to those shown in Fig. 1 to the ocntrol electrodes of cold cathode tubes TH, H, T and U so that there are 40 such tubes common to the whole exchange. The control electrodes of each of the respective tubes TH are connected to rectifiers RC connected to all lines having the same value of the thousands digit and similarly with the tubes H, T and U for the hundreds, tens and units digits. Fig. 4 shows the line 1234 connected through a rectifier RA to two rectifiers RC12 and RD12, common to all lines having the designation 12XX, and the point C1 on the connection through rectifier RC12 is connected to the control electrode of a gas-filled tube TH1 to which corresponding points of all connections to lines having the thousands digit 1 are connected similarly. The point C2 of the connection to the line 1234 is connected to the control electrode of a cold cathode tube H2 to which similar points from all lines having the hundreds digit 2 are connected. Similarly, the tube T3 is common to all lines having the tens digit 3, and the tube U4 to all lines having the units digit 4. A plurality of identification circuits such as ICC is provided and the anodes of all the gas-filled tubes are multiplied to each of the circuits ICC. In the circuit ICC the anodes of the 10 tubes TH are connected over respective contacts of the relay THZ to digit storage condensers for the different values of the thousands digit. Similarly, the anodes of the tubes H2 are connected over contacts of relay HZ to storage condensers for the values of the hundreds digit, the anodes of the tubes T over contacts of a relay TZ to condensers for storing the values of the tens digits, and the anodes of the tubes U over contacts of the relay UZ to condensers for storing the values of the units digits.

When a line is to be identified from a circuit ICC the relay ST operates and connects battery over back contacts of relay SO and the left hand winding of relay TR to ground over a resistance in the common equipment. If no other ICC circuit is connected to this common equipment, relay TR operates and connects relay DT in its operating circuit. By the connection of the low resistance winding of relay TR in series with the low resistance winding of relay DT, which windings together shunt the high resistance winding of relay TR, the common equipment is made busy to any other circuit ICC. Relay DT connects ground to a slow operating relay SO and also over back contacts of relay SO to relays THZ, HZ, TZ and UZ to operate those relays. The relay UZ connects a marking potential to the line to be identified over a brush and contact of a finder switch CF by which the circuit ICC has been connected to a connection being set up, and this potential is extended back to the line to be identified and from there over the rectifiers shown to the control electrodes of a cold cathode tube in each set. A discharge is initiated in the tubes representing the values of the respective digits of the line designation, and a circuit is completed for the corresponding digit storage condensers to charge these condensers. When relay SO operates it breaks the circuit of the relays THZ, HZ, TZ and UZ, and closes a locking circuit for itself to front contacts of the relay ST. In operating relay SO disconnects the potential that has busied the common equipment.

Figure 5:
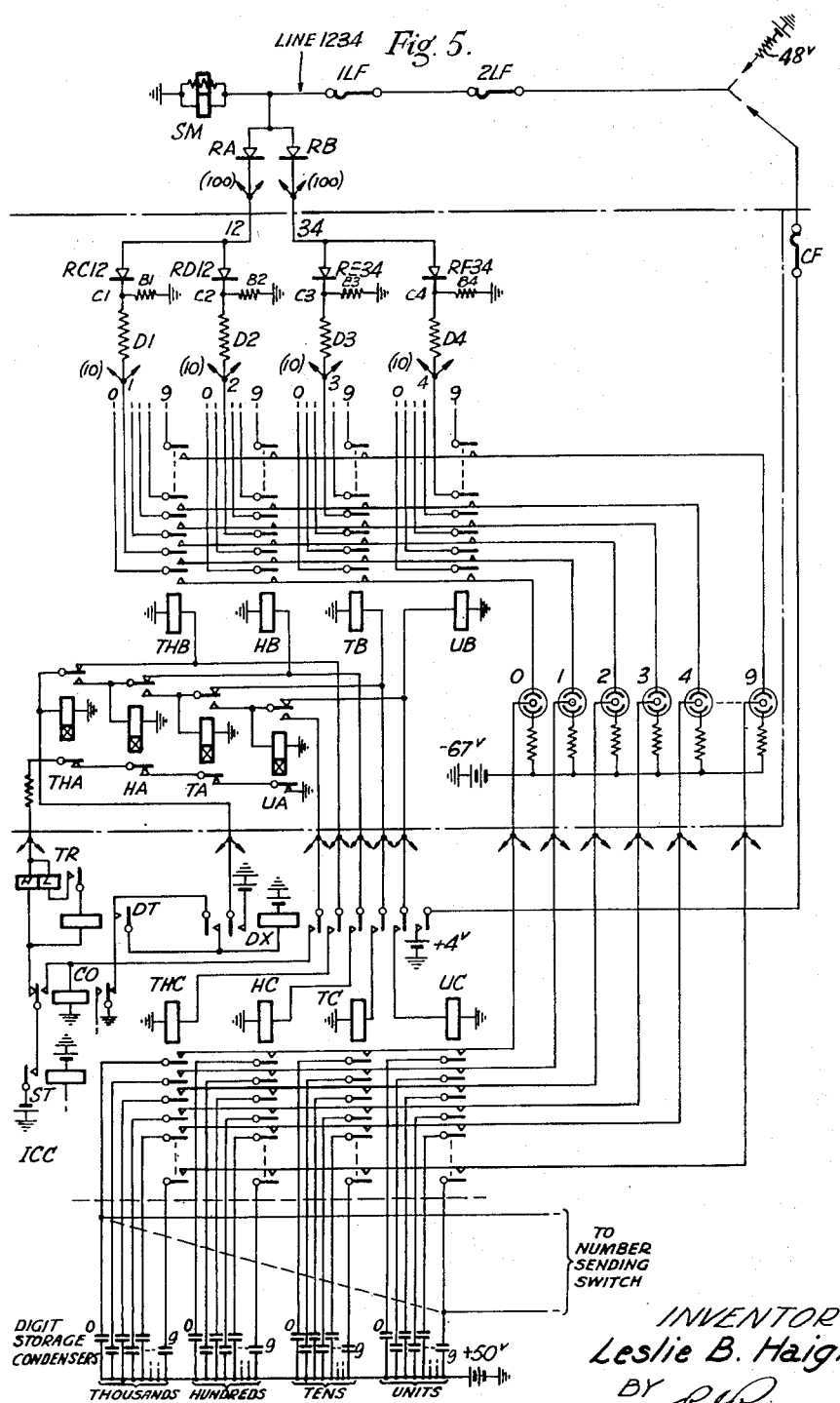
Figure 5 shows a modification of Fig. 4.

This arrangement may be modified, as shown in Fig. 5. In the arrangement shown in this last mentioned figure, each line is connected to points C1, C2, C3 and C4 characteristic of the values of the respective digits of its designation, but these points are not connected to cold cathode tubes as in Fig. 4, instead they are connected to contacts of relays THB, HB, TB and UB. The common equipment comprises 10 gas-filled tubes of which Nos. 0, 1, 2, 3, 4 and 9 only are shown. The common equipment also comprises sequence relays THA, HA, TA and UA, the connections from the common equipment being multiplied to a plurality of identification control circuits ICC in the manner shown. The ground indicating that the common equipment is free is connected over back contacts of relays UA, TA, HA and THA to the windings of a relay TR in each circuit ICC. When a circuit ICC requires to identify a line the relay ST is operated and applies battery over back contacts of relay C0 and a winding of TR to the connection to the common equipment, and if the latter is free there is a circuit for relay TR to ground. Relay TR thereupon operates, busies the common equipment by operating the relay DT, which thereupon closes a circuit for the relay DX. DX closes a circuit for the slow operating relay THA and over back contacts of THA for the quick operating relays THB and THC. Relay THB operates and connects the point C1 to the control electrodes of the cold cathode tubes 0-9, at the same time placing a marking potential on the line to be identified. The anodes of the tubes 0-9 are connected over contacts of THC to storage condensers for the values of the thousands digit. When relay THA operates it disconnects relays THB and THC and connects into circuit the relays HB and HC so that now the points C characteristic of the values of the hundreds digits are connected to the tubes 0-9 and the anodes of these tubes are connected to the storage condensers for the hundreds digit. Similarly, when HA operates it connects up TB and TC and causes the registration of the value of the tens digit on the tens digit condensers, and when TA operates it operates UB and UC so that the value of the units digit is registered, when UA operates relays UB and UC are disconnected and relay C0 is operated. Relay C0 disconnects the potential applied from the contacts of relay ST and frees the common equipment.

The arrangements hereinbefore described can be applied to exchanges in which each subscriber's line is provided with a separate wire for metering purposes, but the connections to the set of points for each denomination of the digits of the line designated cannot be made to a wire of the subscriber's line to which a meter is connected if booster metering is used. The modification shown in Fig. 6, however, is readily applied to exchanges in which booster metering is used. In this arrangement a line wire of the subscriber's line is connected to the sets of points for the denominations of the digits of the line designation over condensers. Each line, for example, No. 1234, is connected over a condenser CA individual to the line to contacts of the thousands and hundreds sets of a switch IF in the same way as a line wire was connected over the rectifier RA in Fig. 1. The wire is also connected over a second condenser CB individual to the line to contacts of the tens and units sets. The potential applied to the line wire of the subscriber is in this case an alternating potential preferably within the voice frequency range. This potential applied to line No. 1234, for example, will flow over condenser CA to the wire common to all lines having 12 as the first two digits of its designation. From any one of those lines it may flow over the condenser CB individual to that other line, and so become a potential upon contacts in the tens and units sets, other than the contacts belonging to line No. 1234 supposed to be in process of being identified. Similarly, the tone applied to line No. 1234 may go over condenser CB to the wire common to all lines having the last two digits 34 in common, and thence from one of those lines through its individual condenser CA to contacts in the thousands and hundreds sets, other than the contacts to which line 1234 is connected.

In order, therefore, to provide decoupling means for preventing undesired operation of devices connected to one line when contacts corresponding to values of the digits of the designation of another line are closed, relays DCA and DCB are provided, common to the exchange, over the back contacts of which condensers CA and CB are connected directly to ground. These relays are connected to the respective halves of an additional contact bank of switch IF so that when this switch is moving over contacts in the thousands and hundreds sets the relay DCA is operated and thus removes the short-circuit on the tone applied to the line over condenser CA. The condenser CB, however, is still connected directly to ground so that the alternating potential through condenser CB cannot flow in any substantial degree over the condenser CB belonging to any other line and be applied to any other of the thousands and hundreds contacts than those belonging to the line being identified. When the brushes of the switch IF have left the thousands and hundreds sets of contacts the relay DCA is de-energised and the condenser CA is again connected directly to ground. The relay DCB is energised when the switch IF is hunting over the sets of contacts belonging to the tens and units digits and thus allows the alternating potential applied to the line to be applied over condenser CB to contacts in the tens and units sets of contacts, whilst preventing the potential over condenser CA from flowing over the condensers CA and CB of some other line and being applied to contacts of that other line in the tens and units sets.

Figure 6:
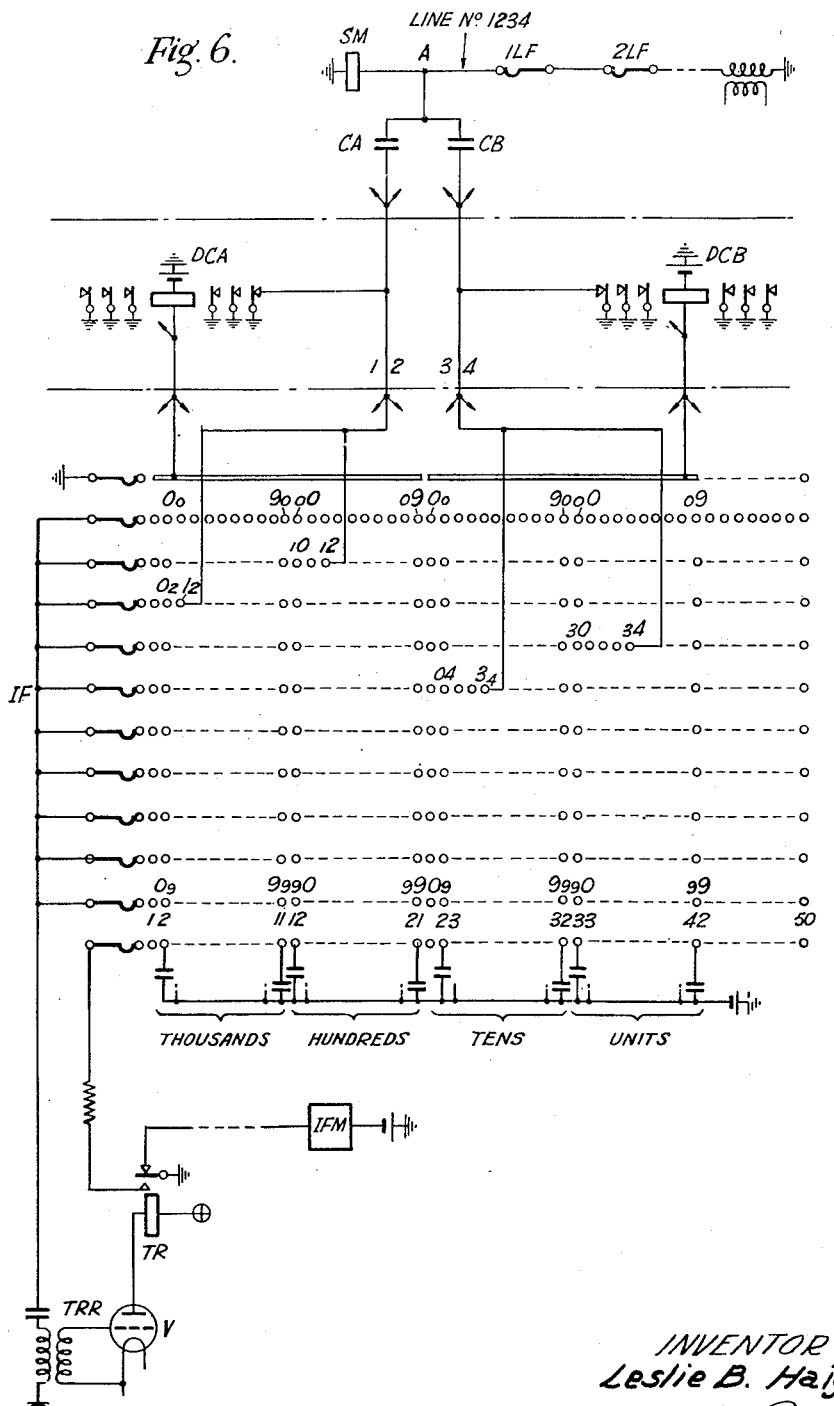
Figure 6 shows an arrangement in which each line is connected to points of said sets of points through condensers.

In the arrangements shown in Fig. 6 this alternating potential is detected in known manner by means of a transformer TRR having a primary tuned to the frequency of the alternating potential and its secondary connected in the grid circuit of a thermionic valve V. A relay TR in the anode circuit of the valve responds to the increased anode current when the potential applied to a line is connected and breaks the circuit of the switch magnet IFM at the same time applying ground to one side of one of the condensers for registering the value of a digit.

The switch IF shown in Fig. 6 may be replaced by four switches IFA, IFB, IFC and IFD in a way similar to that shown in Fig. 3 for modifying the circuit of Fig. 1.

Fig. 7 shows the manner in which the storage condensers shown in Figs. 1 or 4, 5 or 6 for registering the values of the digits of the line designation may be replaced by storage relays. Relays AR, BR, CR and DR are shown for the thousands digit and these are connected to the points 0-9 to which storage condensers in the preceding figurse are connected. These relays operate in combinations as shown below to register the respective digit values.

```
0 ---------------------------------- AR
1 ---------------------------------- AR, BR
2 ---------------------------------- AR, CR
3 ---------------------------------- BR
4 ---------------------------------- BR, CR
5 ---------------------------------- BR, DR
6 ---------------------------------- CR
7 ---------------------------------- CR, DR
8 ---------------------------------- DR
9 ---------------------------------- DR, AR
```

The operated relays close locking circuits for themselves. The relays AR, BR, CR and DR are shown as connecting ground to respective wires to which it is assumed are connected the selecting magnets of an aggregate motion printing telegraph apparatus. These magnets select the position of a typewheel corresponding to the digit to be printed.

Figure 8:
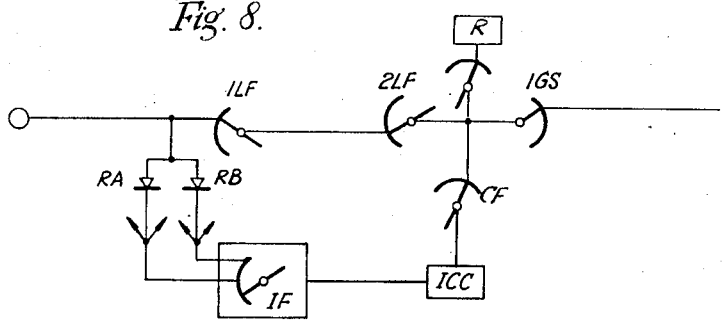
Figures 8, 9, 10 and 11 are junction diagrams showing how the identification arrangements of preceding figures are used in an automatic ticketing system.

Fig. 8 is a junction diagram showing how the arrangements in Figs. 1, 2 or 3 may be applied to "automatic ticketing." When it is determined at any point in a connection that particulars of the call are to be recorded on a printed ticket, an identification control circuit ICC is taken into use to control the identification of the calling line and to mark the line to be identified.

The calling line is shown as extended over line finders ILF and 2LF to a link circuit ending in a first group selector IGS. A register controller R is taken into use from the link circuit over a finder switch RC and controls the setting up of the connection.

The identification control circuit ICC is shown in Fig. 8 as connected over a finder CF of the link circuit, but it may be connected through a finder to the circuit of a junction outgoing from the first group selector IGS. There will in practice be a plurality of these identification control circuits ICC available for use and each of them is associated with an identification finder switch IF which may take any of the forms shown in Figs. 1, 2 or 3. When the identification control circuit has been taken into use it tests whether any of the identification finders IF are in operation, and if none are in operation, it sets the finder IF associated therewith into motion and busies the other finders. The values of the digits of the designation of the calling line are registered in any of the ways described above and when the switch IF has come to rest any of the other corresponding switches are rendered free for rotation under the control of another circuit ICC. In the meantime, the circuit ICC shown, controls the transmission of the values of the digits stored by the switch IF, either to circuits directly associated with ICC if the ticket is to be printed at the location at which ICC is situated, or controls the transmission of these values in well-known manner over the junction to the place where the ticket is to be printed or the particulars to be printed are to be stored until a printer is taken into use.

It is, of course, to be noted that the designation of a calling line that is to be printed on a ticket includes a portion indicative of the exchange to which the subscriber's line is connected. This portion of the identity of a line is, of course, immediately available to any circuits for automatic ticketing purposes and does not need to be discovered. Accordingly in the present specification and claims the expression "line designation" refers only to the number of the line on the exchange, or, in the case in which subscribers on an exchange are arranged in large groups so that a portion of the numerical designation of the line is immediately available, only to that portion of the number which is not immediately available and requires to be discovered.

Figure 9:
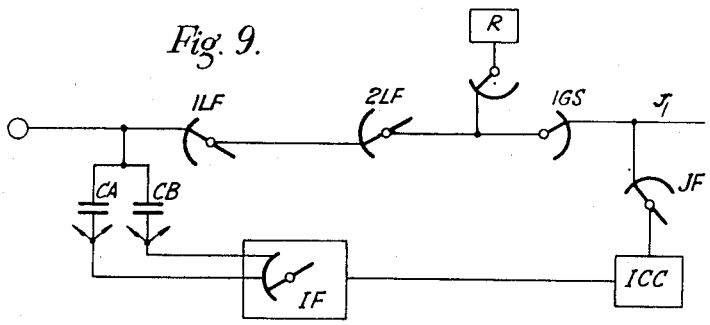

Fig. 9 shows a junction diagram adapted for the use of the identification circuit of Fig. 6. It shows the calling line connected through individual condensers CA and CB to contacts in the bank of an identification finder as in Fig. 6. It differs otherwise from Fig. 8 only in that the identification control circuit ICC is connected to a junction J over a junction finder JF instead of the link circuit.

Figure 10:
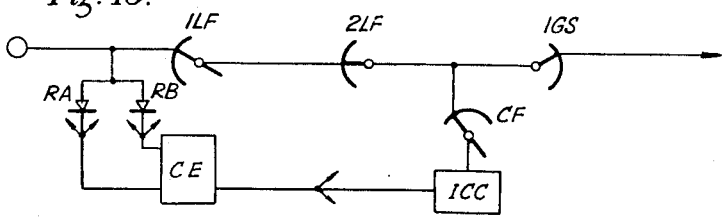

Figure 10 shows a junction diagram to illustrate the use of the identification circuits of Fig. 4 or Fig. 5. It differs from Figure 8 in that there is only one identification equipment CE common to the exchange, which is multipled to a plurality of identification control circuits of which one is shown. This identification control circuit seizes the common equipment CE and operates it to identify the line in the manner previously described with reference to Fig. 4 or Fig. 5.

Figure 11:
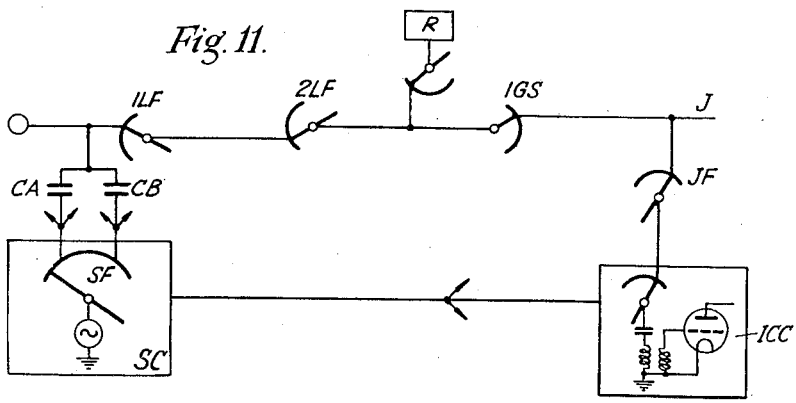

In all previous arrangements of which I am aware for identifying a calling line the potential that is to mark a line to be identified is applied thereto from the circuit requiring to know the designation of the line. With the arrangements described above, however, it is possible to reverse this procedure and to cause the identifying potential to be applied to the wires of groups of lines in succession. Such an arrangement is shown diagrammatically in Fig. 11 for the particular embodiment in which the identifying potential is an alternating potential. In this figure a calling line is extended over first and second line finders ILF and 2LF to a link circuit ending in a first group selector IGS, register controller R is connected to the link circuit and controls the setting up of the connection. It is assumed in the arrangement shown in Fig. 11 that only calls going over certain junctions from the banks of the first group selector IGS will be charged by means of printed tickets. Accordingly, when a junction J is taken into use of this particular group of junctions an identification control circuit ICC is connected to the junction circuit over a finder JF. There is, of course, a plurality of circuits ICC and each of these circuits is multipled to a single circuit SC which is the control circuit for a switch SF, the contacts of which are connected over condensers CA and CB to subscribers lines, in the manner shown in Fig. 6, the decoupling arrangements as shown in that figure being also provided. The switch SF is rotating continuously and the control circuit SC comprises a source of alternating current which is connected to the brushes of the switch SF. This alternating potential is thus connected first to all lines with the thousands digit 0, then to those with the digits 1-9 in turn, then to those with the hundreds digits 0-9, tens digits 0-9, and finally units digits 0-9. In 40 steps this alternating potential has been sent to all lines in the exchange. Each of the circuits ICC is provided with a circuit for detecting and responding to the alternating potential connected to the meter wire of the line, the identity of which is to be discovered. ICC is also provided with a switch having 40 contacts to which are connected means for registering the values of the digits of the line. This switch is arranged to be stepped from a source of impulses that is also stepping the switch SF. The switch SF sends a special start signal when it arrives at its home contacts which signal starts the switch in the circuit ICC to be stepped in synchronism with the switch SF. As the switch in the circuit ICC passes over a contact upon which the alternating current potential appears the corresponding value of the digit is registered.

It will be seen that several marked lines can be identified concurrently over one and the same meter wire multiple, the only limit being the number of tone detectors which will operate in parallel on the one source. There is, however, no technical difficulty in providing enough alternating potential energy to operate any number of detectors simultaneously and the switches SF etc. can be stepped at whatever speed is convenient. The switch SF can obviously be replaced by four switches connected in series in the same way as the switches of Fig. 3.

Since this arrangement allows of a very large amount of identification traffic being dealt with very economically it renders possible and economic an arrengement in which the subscribers meter can be altogether abolished. Local calls as well as multi-fee calls may be recorded by automatic ticketing, or multi-fee calls may be recorded by automatic ticketing and local calls may be recorded on perforated tape by tape perforator associated with the circuit ICC, the records on the perforated tape being afterwards sorted by means of an automatic sorting machine.

What I claim is:

1. A circuit arrangement for identifying a line connected to a telecommunication exchange comprising a plurality of points less in number than the number of lines connected to said exchange and divided into sets, one for each denomination of the digits of a line designation, a network of connections of the lines to the points such that each line is connected to points characteristic of the values of the respective digits of its designation, means for connecting potential to a line to be identified, means for establishing circuits including successively said points, means operative by said potential in said circuits including said points to which the last mentioned line is connected for causing the registration of the values of the digits of the designation of said line, and decoupling means for preventing said potential being extended over any of said points to cause the registration of the values of the designation of a line not required to be identified.

2. A circuit arrangement for identifying a line connected to a telecommunication exchange comprising a plurality of points less in number than the number of lines connected to said exchange divided into sets, one for each denomination of the digits of a line designation, a network of connections of the lines to the points such that each line is connected to points characteristic of the values of the respective digits of its designation, means for connecting potential to a line to be identified otherwise than over said points, means for establishing circuits including successively said points, means operative by said potential in said circuits including the said points to which the last mentioned line is connected for causing the registration of the values of the digits of the designation of said line, and decoupling means for preventing said potential being extended over said points to cause the registration of the values of the designation of a line to which said potential was not connected.

3. A circuit arrangement for indicating which of a group of telecommunication lines is participating in a connection, comprising potential applying means for applying a potential to each of the group of lines in predetermined sequence, potential responsive means responsive to the reception of said potential at a point in the connection and means for indicating the position of said potential applying means in said sequence at the moment when the potential responsive means responds.

4. A circuit arrangement for identifying a line connected to a telecommunication exchange comprising progressively operable means for applying potential in turn to groups of lines, the lines to which potential is applied at any one time having a designation with a given value of a digit of a given denomination, means responsive to said potential connectable to a line to be identified and means operating in synchronism with said progressively operable means for causing in cooperation with said potential responsive means the registration of the designation of the line to be identified.

5. A circuit arrangement for identifying a line connected to a telecommunication exchange comprising a plurality of points less in number than the number of lines connected to said exchange, divided into sets, one for each denomination of the digits of a line designation, a network of connections of the lines to the points such that each line is connected to points characteristic of the values of the respective digits of its designation, potential means for connecting potential to each point of said set of points in predetermined sequence, means for connecting to a line to be identified potential responsive means adapted to respond to the reception of said potential, means for indicating the position of said potential applying means in said sequence at the moment when the potential responsive means responds, and decoupling means for preventing said potential being extended over said points to cause the response of potential responsive means connected to a line corresponding to a position in said sequence different from that of said potential applying means.

6. A circuit arrangement for identifying a line connected to a telecommunication exchange comprising normally open contacts less in number than the number of lines connected to said exchange, a connection from each line to said contacts characteristic of the values of the respective digits of the designation of said line, means for applying a potential to one of said lines means for closing said contacts to complete circuits over certain of said contacts for a device responsive to said potential and thereby to cause the registration of the values of the respective digits of the designation of the line to which potential was connected.

7. A circuit arrangement for identifying a line connected to a telecommunication exchange comprising a plurality of sets of contacts, each set individual to a denomination of digits in said line designation and arranged in a two-coordinate arrangement, a network of connections of the lines to the contacts such that each line is connected to a contact of a set having a number in a first co-ordinate equal to the value of the respective digit in the designation of said line and a number in a second coordinate equal to the value of the digit of another denomination of said line, means for connecting a potential to said line, means for progressively closing in turn contacts having different numbers in said first co-ordinate all contacts being closed with the same number in said first co-ordinate simultaneously, means for connecting to a line concurrently with the closure of contacts corresponding to the values of digits of the designation of said line devices adapted to be operated by the potential applied to a line to cause the registration of the values of the digits of a line designation in accordance with the numbers of the contacts closed when the said devices are connected and decoupling means for preventing undesired operation of devices connected to one line when contacts corresponding to values of digits not contained in the designation of another line are closed.

8. A circuit arrangement as claimed in claim 7 in which the said potential is a constant potential connected to said line otherwise than through said contacts and a device adapted to be operated by said potential is a cold cathode discharge tube, the control electrode of which is connected to said line through said contacts.

9. A circuit arrangement as claimed in claim 7 in which the said potential is a constant potential connected to said line otherwise than through said contacts and a device adapted to be operated by said potential is a cold cathode discharge tube, the control electrode of which is connected to said line through said contacts and in which means is provided responsive to the initiation of a discharge in said tube for charging a condenser individual to a particular denomination of a digit and to a particular value of said digit.

10. A circuit arrangement as claimed in claim 7 in which the said potential is a constant potential connected to said line otherwise than through said contacts and a device adapted to be operated by said potential is a cold cathode discharge tube, the control electrode of which is connected to said line through said contacts and in which means is provided responsive to the initiation of a discharge in said tube for stopping the progressive closure of said contacts.

11. A circuit arrangement as claimed in claim 7 in which said device adapted to be operated by said potential is a cold cathode tube and in which the said contacts in the sets individual to the different denominations of digits are closed in turn by a single progressively operable switch, momentarily stopped by the initiation of a discharge in said tube whereby a condenser connected to other contacts of said switch is connected to a constant potential to charge said condenser, means being provided for extinguishing said discharge and continuing the movement of said switch.

12. A circuit arrangement as claimed in claim 7 in which said device adapted to be operated by said potential is a cold cathode tube and in which contacts in the sets individual to the different denominations of digits are closed in turn by a single progressively operable switch, means is provided for charging a condenser over a discharge path in said tube and over other contacts of said switch, means is provided for extinguishing the discharge in said tube when the brushes of said switch leave said contacts and means is provided for discharging any condenser previously left charged when the brushes of the said switch move over a contact connected to said last mentioned condenser and no discharge is taking place in said tube.

13. A circuit arrangement as claimed in claim 7 in which said device adapted to be operated by said potential is a cold cathode tube and in which the said contacts in the sets individual to the different denominations of digits are closed by progressively operable switches individual to the different sets, means being provided responsive to the initiation of a discharge in said tube for stopping the respective switches in positions which register the values of the respective digits of the line designation.

14. A circuit arrangement as claimed in claim 1 in which each line in an exchange is connected through a first rectifier to a first point common to all lines having a first part of the designation the same and through a second rectifier directed with respect to the line similarly to the first rectifier to a second point common to all lines having a second part of the designation the same, and in which the said potential connected to the line is a constant potential in a direction adapted to drive current through said rectifiers.

15. A circuit arrangement for identifying a line connected to a telecommunication exchange comprising a pair of rectifiers individual to each line on said exchange, like electrodes of said pair of rectifiers being connected to said line and the other electrodes being connected to points indicative of respective portions of the designation of said line, means for applying a constant potential to said line, and means for connecting to said points devices responsive to said potential to cause the registration of the several portions of said designation.

16. A circuit arrangement as claimed in claim 7 in which said potential is a constant potential connected to said line, the designation of said line comprises digits of at least three denominations and said decoupling means comprises a pair of rectifiers individual to each line and similarly disposed to connect the line through one of said rectifiers to contacts situated in two different sets and through the other rectifier to a contact in at least one other set, said decoupling means comprising also a rectifier poled like the pair of rectifiers and placed in each connection to a bank of said contacts.

17. A circuit arrangement as claimed in claim 7 in which each line is connected through a first condenser to contacts in two of said sets of contacts closed in turn said line is connected through a second condenser to another set of contacts closed in turn but not simultaneously with those of the first mentioned two sets, said potential applied to said line is an alternating potential, and said decoupling means comprises means for connecting the side of one of said condensers remote from said line to ground whilst the contacts connected to said line through the other of said condensers are closed.

18. A circuit arrangement as claimed in claim 7 in which said potential is connected to said line over said contacts and a device responsive to said potential is connected to said line over a contact of a set of contacts closed in synchronism with the contacts over which said potential is connected.

19. A circuit arrangement for identifying a line connected to a telecommunication exchange comprising a set of points for each denomination of the digits of a line designation and a number of points in each set equal to the number of values of each digit, a network of connections of the lines to the points such that each line is connected through an individual rectifier to a point characteristic of a combination of two digits of its designation and from thence through a second rectifier to the point in one set characteristic of the value of one of said digits and through a third rectifier to the point in the other of said sets characteristic of the value of the other of said digits, means for applying potential to said line and means for connecting to each point in each set of points a device responsive to said potential.

20. A circuit arrangement as claimed in claim 19 in which a number of said devices equal to the number of said points is provided and all said devices are connected to their respective points simultaneously.

21. A circuit arrangement as claimed in claim 19 in which a number of said devices equal to the maximum number of digits in any one denomination of digits in a line designation is provided and said devices are connected in turn to the respective points in the several sets of points.

22. A circuit arrangement as claimed in claim 19 in which each of said devices is a cold cathode discharge tube.

23. A circuit arrangement as claimed in claim 1 in which said points or contacts are connected to a wire of the line connected to a meter for metering the charge for calls.

LESLIE B. HAIGH.